(12) United States Patent
Semegn et al.

(10) Patent No.: US 12,158,974 B2
(45) Date of Patent: Dec. 3, 2024

(54) SCAN SURFACE REDUCTION FOR SENSITIVE INFORMATION SCANNING

(71) Applicant: Microsoft Technology Licensing, LLC, Redmond, WA (US)

(72) Inventors: Assefa Semegn, Redmond, WA (US); Wing Kwong Wan, Redmond, WA (US); Liye Xu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 17/733,530

(22) Filed: Apr. 29, 2022

(65) Prior Publication Data

US 2023/0351045 A1 Nov. 2, 2023

(51) Int. Cl.
*G06F 21/62* (2013.01)
*G06F 40/205* (2020.01)

(52) U.S. Cl.
CPC ...... *G06F 21/6254* (2013.01); *G06F 21/6209* (2013.01); *G06F 40/205* (2020.01)

(58) Field of Classification Search
CPC ............... G06F 21/6254; G06F 40/205; G06F 21/6209; G06F 21/6245
USPC .......................................................... 726/26
See application file for complete search history.

(56) References Cited

U.S. PATENT DOCUMENTS

| | | | | |
|---|---|---|---|---|
| 8,997,248 | B1* | 3/2015 | McKay | G06F 21/62 726/27 |
| 10,318,762 | B1* | 6/2019 | Buckingham | H04L 9/0643 |
| 10,529,336 | B1* | 1/2020 | Matthews | H04M 1/271 |
| 11,810,379 | B1* | 11/2023 | Vickers | G06F 16/3347 |
| 2013/0185803 | A1* | 7/2013 | Travis | G06F 21/6218 726/26 |
| 2016/0277368 | A1* | 9/2016 | Narayanaswamy | G06F 21/6209 |
| 2017/0185799 | A1* | 6/2017 | Zheng | G06F 16/9535 |
| 2018/0096021 | A1* | 4/2018 | Lotzer | G06F 16/2365 |
| 2018/0232528 | A1* | 8/2018 | Williamson | G06N 5/025 |
| 2018/0248887 | A1* | 8/2018 | Sayed | H04L 63/105 |
| 2019/0180049 | A1* | 6/2019 | LeCour | G06F 21/6245 |
| 2020/0019606 | A1* | 1/2020 | Ren | G06V 30/413 |
| 2020/0104046 | A1* | 4/2020 | Hopper | G06F 3/067 |
| 2020/0137110 | A1* | 4/2020 | Tyler | H04L 63/1483 |

(Continued)

OTHER PUBLICATIONS

"About Secret Scanning", Retrieved from: https://web.archive.org/web/20220131013624/https://docs.github.com/en/code-security/secret-scanning/about-secret-scanning, Jan. 31, 2022, 2 Pages.

(Continued)

*Primary Examiner* — Thanh T Le
(74) *Attorney, Agent, or Firm* — Schwegman Lundberg & Woessner, P.A.

(57) ABSTRACT

Generally discussed herein are devices, systems, and methods for scan surface reduction in sensitive information scanning. A method can include receiving a document, determining, by an evidence checker, a keyword that indicates sensitive information of a sensitive information type, is present in the document, responsive to determining the keyword is present, determining, by a sensitive information scanner and based on a regular expression associated with the sensitive information type, that sensitive information is present in the document, and performing a sensitive information mitigation operation to mitigate the sensitive information.

20 Claims, 4 Drawing Sheets

(56) References Cited

U.S. PATENT DOCUMENTS

| | | | | |
|---|---|---|---|---|
| 2022/0043927 A1* | 2/2022 | Sofer | ............... | G06F 21/6218 |
| 2022/0100874 A1* | 3/2022 | Singh | ............... | G06F 21/6218 |
| 2022/0222372 A1* | 7/2022 | Larson | ............... | G06N 20/00 |
| 2022/0245276 A1* | 8/2022 | Gupta | ............... | G06F 21/6218 |
| 2022/0318224 A1* | 10/2022 | Thompson | ............ | G06V 10/70 |
| 2022/0350919 A1* | 11/2022 | Chouman | ............ | G06F 21/6245 |
| 2022/0382891 A1* | 12/2022 | Shmidov | ............... | G06F 16/245 |
| 2022/0405274 A1* | 12/2022 | Shang | ............... | G06F 16/2455 |
| 2023/0185934 A1* | 6/2023 | Seilnacht | ............ | G06F 21/6209 |
| | | | | 726/27 |

OTHER PUBLICATIONS

"Cloud Code Security", Retrieved from: https://web.archive.org/web/20220309132134/https://www.paloaltonetworks.com/prisma/cloud/cloud-code-security, Mar. 9, 2022, 5 Pages.

"CloudGuard for Cloud Security Posture Management", Retrieved from: https://web.archive.org/web/20220219001900/https://www.checkpoint.com/cloudguard/cloud-security-posture-management/, Feb. 19, 2022, 8 Pages.

"Compromised Credentials—Compromised Account Detection", Retrieved from: https://web.archive.org/web/20220116202319/https://www.vericlouds.com/compromised-credentials/, Jan. 16, 2022, 2 Pages.

"Secret Detection", Retrieved from: https://web.archive.org/web/20220117143854/https://docs.gitlab.com/ee/user/application_security/secret_detection/, Jan. 17, 2022, 8 Pages.

"Welcome to GitGuardian [Documentation]", Retrieved from: https://web.archive.org/web/20220228121858/https://docs.gitguardian.com/, Feb. 28, 2022, 1 Page.

Simar, et al., "Aqua Security Trivy", Retrieved from: https://web.archive.org/web/20220203122230/https://github.com/marketplace/actions/aqua-security-trivy, Feb. 3, 2022, 11 Pages.

* cited by examiner

| EVIDENCE | SENSITIVE INFORMATION TYPE (SIT) | REG EX |
|---|---|---|
| EVIDENCE 1 | SIT 1 | REG EX 1 |
| EVIDENCE 2 | SIT 2 | REG EX 2 |
| ... | ... | ... |
| EVIDENCE N | SIT N | REG EX N |

*FIG. 2*

SCAN SURFACE REDUCTION FOR SENSITIVE INFORMATION SCANNING

BACKGROUND

Sensitive information data types are data types that are not expected to be stored in a none-secured environment. Example sensitive information data types include credentials (e.g., username, password, biologic marker (e.g., fingerprint, retina scan, etc.), social security numbers, and credit cards, among others. Detection of sensitive information data types in documents and text normally includes pattern matching of complex regular expressions (regex) against the text. Regex are special strings representing a pattern to be matched in a search operation. As a result, such sensitive information data type scanners take a significant amount of execution time during information processing.

Sensitive information scanning usually involves scanning through all content of documents using various complex regex. Such scans are usually followed by further additional validation or checking of surrounding text to decide whether a detected item is really a sensitive type or not. Although this approach is expensive and time consuming, it is the most dominant approach used by most of the sensitive information type scanners.

SUMMARY

A device, system, method, and computer-readable medium configured for scan surface reduction for sensitive information scanning are provided. The scan surface is a totality of documents to be scanned for sensitive information. The scan surface is reduced by applying a text search, sometimes called an evidence search, that is simpler than a complete regular expression pattern match but returns all (or nearly all but likely more than all) the same matches as the regular expression pattern match. Any portion of a document that is not identified as potentially including sensitive information in the simpler text search is not processed further. Any portion of the document that is identified as potentially including sensitive information in the simpler text search is further scanned using a full regular expression. The full regular expression that is applied to the portion of the document can be limited to just the regular expression that matches a sensitive information type (SIT) associated with the evidence that indicated sensitive information might be present. In this way, the sensitive information scanning time is reduced without risking accuracy.

A computer-implemented method for scan surface reduction for sensitive information scanning can begin by receiving a document. An evidence checker can determine whether a keyword that indicates sensitive information of a SIT, is present in the document. Responsive to determining the keyword is present, a sensitive information scanner can determine, based on a regular expression associated with the SIT, that sensitive information is present in the document. A sensitive information mitigation operation can be performed to mitigate the sensitive information.

The evidence can be a text string that indicates a shape of the SIT. The SIT can include one of credit card information, social security number information, user credentials, or other SIT. The keyword can be one of a plurality of keywords. The SIT can be one of a plurality of SITs. Each of the keywords can be associated with a SIT of the SITs. At least two of the keywords can be associated with different SITs of the SITs. The regular expression can be one of a plurality of regular expressions. Each regular expression can be associated with a SIT of the SITs and a keyword of the keywords. Determining the keyword is present in the document can include determining which of the keywords are present in the document. The method can include detecting, for each keyword of the keywords present in the document and based on a regular expression associated with the sensitive information type associated with the keyword, whether sensitive information of the SIT is present in the document.

Only a regular expression of the regular expressions associated with a keyword of the keywords determined to be present in the document can be applied to the document. The sensitive information scanner can be one of a plurality of sensitive information scanners operating in parallel. Each of the plurality of sensitive information scanners can be configured to apply a different regular expression. The method can include extracting a portion of the document including the keyword. The method can include limiting the sensitive information scanner to operate on the portion of the document.

BRIEF DESCRIPTION OF DRAWINGS

FIG. 2 illustrates, by way of example, a data structure that relates evidence and regular expression(s) by sensitive information type (SIT).

DETAILED DESCRIPTION

Figure 1:
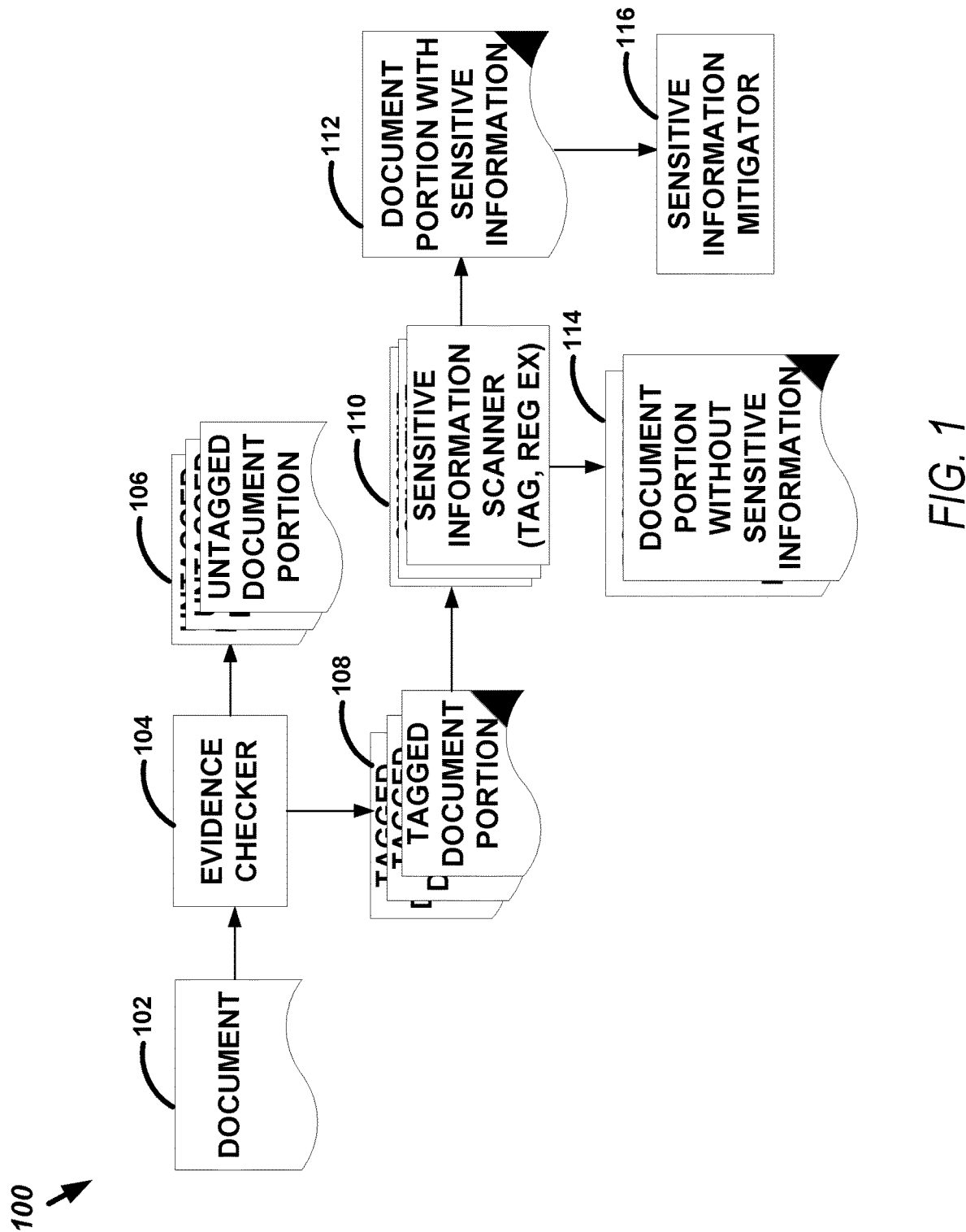
FIG. 1 illustrates, by way of example, a block flow diagram of an embodiment of a system for improved sensitive information scanning in documents.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

A sensitive information type (SIT) is generally found in less than 10% of documents. Further, within those documents that contain one or more SITs, less than about 10% of the content in those documents will contain a SIT. This means that, in general, only 1% of the content from all documents will include sensitive information. Current sensitive information scanning logic (e.g., hardware, software, firmware, or a combination thereof) that detects sensitive information presence is time and resource intense. Thus, compute gains can be realized by reducing the amount of scanning performed using sensitive information scanner logic.

A sensitive information detection system uses reduced surface scanning in sensitive information detection in data files. The surface is the totality of the data files to be scanned. The reduced surface scanning means that fewer portions of documents are scanned in detail. Reduced surface scanning converts a list of low frequency yet simple keywords or evidence patterns into a deterministic-finite-automata. The evidence is a set of keyword or simplified regular expressions. Simplified regular expressions only use alternations and very limited wildcards. Simplified regular expression do not include quantification and grouping syntax. The evidence, which can be tested using a simplified regular expression, gives a full but minimal coverage of an un-simplified regular expression pattern match.

The deterministic-finite-automata looks at sequences of characters and determines whether any of a set of defined keywords is present in the documents. Each of the keywords are associated with one or more SITs. Thus, the deterministic-finite-automata identifies a limited number of potential text regions as candidates for detecting SITs. After these candidate regions are identified, those identified text regions get scanned using only relevant regular expression patterns (sometimes called "regular expressions") and the remainder of the text regions are not subjected to further scanning. The relevant regular expression patterns are identified through association with a given SIT. Thus, if a keyword is detected and that keyword is associated with the given SIT, the corresponding regular expression(s) that are also associated with the given SIT is used to scan the document portion. This surface reduction reduces the scanning target to a fraction of the document and the actual relevant scanners to a fraction of all scanners, resulting in significant performance gain.

In one example, the system provides credential scanning. When the system is coupled with other performance improvement techniques such as concurrency, embodiments may produce a performance gain over current state of the art sensitive information detectors.

Instead of applying full pattern scanning on the whole document as in prior approaches, evidence text or keywords are used to first identify regions of interest to filter the content and only scan those regions of interest using one or more regular expressions. Searching of the filtered content is much quicker than searching all content with the full pattern. Filtering can reduce content of the document to be scanned to just a small portion of the document (e.g., to about 10-20% on average) depending on the distribution of the keywords or text. After a region that might include sensitive information is identified, instead of scanning that region with a full set of regular expression patterns, the system can scan the region with regular expression patterns that are likely to be found given the evidence. This means that only the regular expression patterns that are related to the evidence keywords are used. As regular expression scanning is compute resource and compute time intensive, the reduction in the number of regular expressions used in scanning improves the operation of the sensitive information scanning in terms of compute time and compute resource usage.

The system may include one or more improvements such as:
1) Scan surface reduction using keywords to find candidate regions
2) Regular expression pattern application reduction to only apply relevant patterns to candidate regions based on the detected keywords.

Reference will now be made to the FIGS. to describe further, non-limiting details of embodiments.

FIG. 1 illustrates, by way of example, a block flow diagram of an embodiment of a system 100 for improved sensitive information scanning in documents. The system 100 as illustrated includes an evidence checker 104, a sensitive information scanner 110, and a sensitive information mitigator 116. The system 100 performs sensitive information scanning faster and just as accurate as prior sensitive information scanning systems.

The evidence checker 104 determines whether a text string is present in the document 102. The text string is sometimes called "evidence". The text string can be specified in a format that allows a user to specify a series of generic or specific alphabetic ("/a/"), numeric (/"n"/), symbols ("/s/"), wildcards ("/*/") that represent any alphabetic, numeric, or symbols, or a combination thereof. The text string thus indicates a shape of the evidence that indicates the SIT. The evidence checker 104 can "slide" the text string across the content of the document 102 to determine whether the evidence of sensitive information is present in the document 102. For example, the text string "/n//n//n/-/n//n/-/n//n//n//n/", "SS#", "social security number", "soc. sec. no.", or "/n//n//n//n//n//n//n//n//n/" when detected can indicate a social security number is present in a document. In another example, the text string "/n//n//n//n//n//n//n//n// n//n//n//n//n//n/", "/n//n//n//n//n//n//n//n//n//n//n//n//n//n/ n/" "CC#", "CVV", "expiration date", "exp. date", "credit card number", "cred. card no.", "security code", "/n//n//n// n//n//n//n//n//n//n//n//n//n//n//n/", or "/n//n//n//n//n//n//n// n//n//n//n//n//n//n/" when detected can indicate sensitive information corresponding to a credit card is present in a document. Other types of sensitive information includes username, password, other credentials, medical records, insurance information, tax information, among others.

If the evidence checker 104 detects the evidence is present in the document 102, the evidence checker 104 can extract a portion of the document that includes the detected evidence. The extracted portion of the document can be tagged as a tagged document portion 108. The tag can indicate the evidence detected, the SIT associated with the evidence, or a combination thereof. The document portion 108 can include the evidence and a specified amount of the document 102 immediately before and immediately after the detected evidence. The specified amount can be dependent on the type of evidence detected. The SIT that is associated with the evidence can be indicated by the tag. The tag can thus indicate "credit card", "social security number", "medical record", or another SIT.

The amount of the document 102 before and after the detected evidence in the tagged document portion 108 can be configurable or default. The amount of the document 102 before the detected evidence and the amount of the document 102 after the detected evidence can be the same or different. The amount of the document 102 before and after the detected evidence in the tagged document portion 108 can be different for different evidence types. For example, if the SIT is medical records, then more of the document 102 can be provided as a tagged document portion 108 than is provided for the social security number SIT. The tagged document portion 108 thus includes the detected evidence, a portion of the document 102 that appears immediately before the detected evidence, and a portion of the document 102 that appears immediately after the detected evidence.

Any portion of the document that is not part of a tagged document portion 108, called an untagged document portion 106, is removed from further processing. This is because the document 102 is unlikely to have sensitive information and it is much more unlikely that, after checking for the evidence, the untagged document portion includes sensitive information. Removing the untagged document portion 106 from further processing reduces the overall sensitive information scan surface to be performed by the sensitive information scanner 110.

The sensitive information scanner 110 receives the tagged document portion 108 and performs a more in-depth analysis of whether the tagged document portion 108 includes sensitive information. The tagged document portion 108 can be defined as a pair of numbers that represent a start index (start position) and end index (end position) in the document 102. Regular expression pattern matching can be applied to the document 102 between these indices. Final regular expression scan result locations can be calibrated with an offset that equals the text region start index of the tagged document portion 108.

Since detection of the evidence does not necessarily mean that sensitive information is present, the sensitive information scanner 110 performs a more comprehensive analysis, using one or more regular expressions, to determine whether sensitive information is actually present. The sensitive information scanner 110 can identify the tag or tags associated with the tagged document portion 108. Each tag may have a subset of regular expressions associated with the tag that are most likely to be relevant to the corresponding evidence. The sensitive information scanner 110 can then apply the one or more regular expressions associated with evidence to the tagged document portion 108. The sensitive information scanner 110 may be configured to select only those regular expressions that are associated with detected evidence to the tagged document portion 108. Such a configuration allows the sensitive information scanner 110 to avoid applying all the regular expressions to the document 102 as is performed by prior sensitive information scanners.

The regular expressions are specific to a SIT. That is, a regular expression configured to detect credit card information is different from a regular expression that is configured to detect a social security number, both of which are different from a regular expression that is configured for detecting a medical record, and so on. Reducing the number of regular expressions applied to just those regular expressions associated with the SIT(s) indicated by the evidence reduces the compute time of identifying sensitive information in the document 102. Reducing the number of regular expressions applied to just those regular expressions associated with the SIT(s) indicated by the evidence reduces the compute bandwidth consumed in identifying sensitive information in the document 102.

The sensitive information scanner 110 can add a tag to the tagged document portion 108 if the tagged document portion 108 includes sensitive information. A document portion with sensitive information 112 can include a tag indicating it might include sensitive information, such as by including the SIT of the evidence detected in the document portion 108. Any tagged document portion 108 that is determined, by the sensitive information scanner 110, to not include sensitive information can be discarded from further operation as a document portion without sensitive information 114.

The document portion with sensitive information 112 (or the document 102 that includes the document portion with sensitive information 112) can be provided to a sensitive information mitigator 116. The sensitive information mitigator 116 performs operations to protect the sensitive information of the document 102. The sensitive information mitigator 116 can delete the document 102 or the portion of the document 102 including sensitive information or just delete the sensitive information from the document 102, encrypt the document 102 or the portion of the document 102 including sensitive information or just the sensitive information, redact the portion of the document 102 including sensitive information or just the sensitive information, prompting a sender, author, or other personnel associated with the document 102 to indicate how they would like the sensitive information mitigator 116 to handle the sensitive information and act accordingly, refrain from forwarding the document 102, provide an alert (e.g., by text message, electronic mail, a pop up, audible warning, or the like) that indicates sensitive information was detected and optionally some details of the document 102, or the like.

Using the system 100, the time, compute resources, and compute bandwidth consumed in identifying sensitive information is reduced without sacrificing accuracy. The system 100 allows near real-time scanning of documents for sensitive information.

The system 100 can operate using parallel sensitive information scanners 110. The parallel sensitive information scanners 110 can implement different regular expressions, such as to detect different SITs or different instances of the same SIT. Sensitive information scanners 110 operating in parallel allows the configuration of the sensitive information scanner 110 to be optimized to execute the regular expression on the tagged document portion 108. Optimization in this sense means that the sensitive information scanner 110 is configured to reduce the time, compute complexity, compute bandwidth consumed, or the like, as compared to a more general sensitive information scanner 110 that executes to detect multiple SITs.

FIG. 2 illustrates, by way of example, a data structure 200 that relates evidence 220 and regular expression(s) 224 by SIT 222. The data structure 200 includes entries that are related across rows, but they could be related across columns. Relation across rows means that data in a first row of a first column is related to data in a first row of a second column and to data in a first row of a third column and so on. Thus, in the data structure 200 "Evidence 1", when detected in the document 102 indicates data that might be "SIT 1", and "SIT 1" is tested more rigorously by "REG EX 1".

Figure 3:
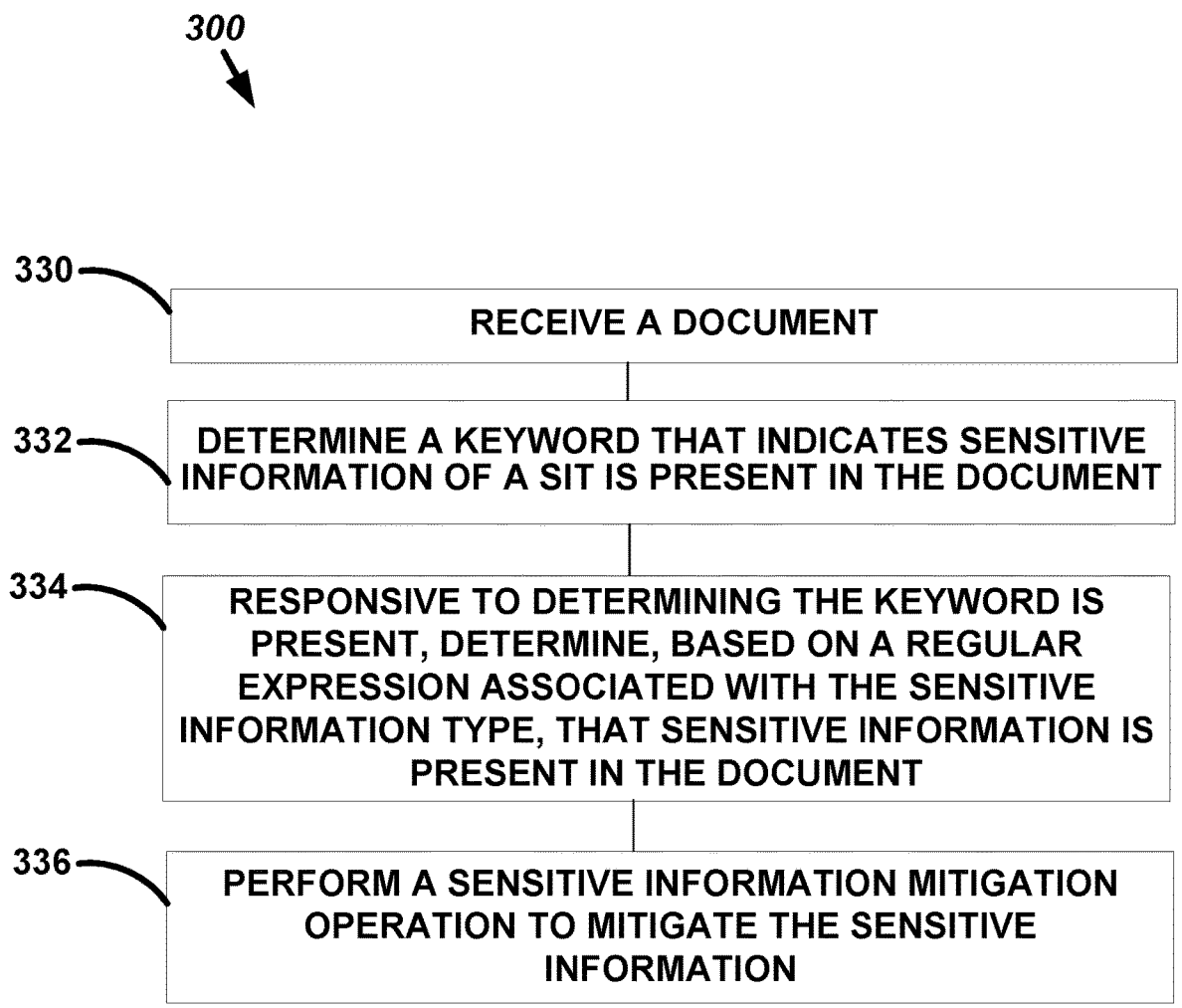
FIG. 3 illustrates, by way of example, a diagram of an embodiment of a method for scan surface reduction for sensitive information scanning.

FIG. 3 illustrates, by way of example, a diagram of an embodiment of a method 300 for scan surface reduction for sensitive information scanning. The method 300 as illustrated includes receiving a document, at operation 330; determining (e.g., by the evidence checker 104), a keyword that indicates sensitive information of a SIT, is present in the document, at operation 332; responsive to determining the keyword is present, determining, (e.g., by the sensitive information scanner 110) based on a regular expression associated with the SIT, that sensitive information is present in the document, at operation 334; and performing a sensitive information mitigation operation to mitigate the sensitive information, at operation 336.

The keyword can be a text string that indicates a shape of the sensitive information type. The SIT can include one of credit card information, social security number information, or user credentials. The keyword can be one of a plurality of keywords. The SIT can be one of a plurality of SIT's, each of the keywords associated with a SIT of the SITs. At least two of the keywords can be associated with different SITs of the SITs. The regular expression can be one of a plurality of regular expressions. Each regular expression can be associated with a SIT of the SITs and a keyword of the keywords. The operation 332 can include determining which of the keywords are present in the document. The method 300 can include detecting, for each keyword of the keywords present in the document and based on a regular expression associated with the sensitive information type associated with the keyword, whether sensitive information of the sensitive information type is present in the document.

In some embodiments, at operation 334, only a regular expression of the regular expressions associated with a keyword of the keywords determined to be present in the document can be applied to the document. The sensitive information scanner 110 can be one of a plurality of sensitive information scanners operating in parallel. Each of the plurality of sensitive information scanners can be configured to apply a different regular expression. The method 300 can further include extracting a portion of the document including the keyword. The method 300 can further include limiting the sensitive information scanner to operate on the portion of the document.

To help explain differences between evidence and a regular expression, examples of both are provided for a few scenarios. For an Azure Active Directory client secret, full regular expression patterns to be evaluated can include the following regular expressions:

[\x00-\x7F-[\/\+\._\-~\$,\\]](?<AadClientSecret>[a-z0-9\-_\.~]{3}(7Q~)?[a-z0-9\-_\.\\~]{31,32})([\x00-\x7F-[\w/\+\.\-~\$]]|$))

(App(lication)?|Client|srv.? pr|service.?principal|spn|object|['"]o).?Id(?s).{0,25}(?-s)(?-i)(?<AccountIdentityValue>[a-f0-9][A-F0-9]){8}-{[a-f0-9]{4}|[A-F0-9]{4}}){3}-([a-f0-9]|[A-F0-9]){12})(?i)

((Tenant(.?id)?|\Wtid)(?s).{0,25}(?-s)(?-i)|login\.microsoftonline\.com/)(?<TenantId>([a-f0-9]|[A-F0-9]){8}(-([a-f0-9]{4}|[A-F0-9]{4})){3}-([a-f0-9]|[A-F0-9]){12})(?i)

Evidence for the Azure Active Directory client secret can include "secret", "password", "key", and "7Q~".

An example client secret (client credential, username, or password) that can be detected using evidence and regular expression is "AppID=6976bfbe-616b-403d-aa0a-1265677ef31c;AppSecret=" " . . . ;"

For slack token, a full regular expression pattern to be evaluated can include the following regular expression:

(?-i)['":=\s](?<Token>xox[pbarose]\-[a-zA-Z0-9]{1,6}\-[a-zA-Z0-9\-]{7,30}(?i))[^.]

Evidence associated with this regular expression can include "xox[pbarose]".

Sample slack tokens that are detected using the slack token regular expression and evidence include:
"xoxp-abcdef-abcdef-abcdef-abcdef"
"xoxb-abcdef-abcdef"
"xoxa-2-abcdef-abcdef-abcdef-abcdef"
"xoxr-abcdef-abcdef-abcdef-abcdef"
"xoxo-abcdef-abcdef-abcdef-abcdef"
"xoxs-abcdef-abcdef-abcdef-abcdef"
"xoxe-abcdef-abcdef-abcdef-abcdef"

Each SIT has a corresponding one or more regular expression patterns and corresponding evidence. The Azure Active Directory client secret and slack token are merely examples and there are many other examples.

Figure 4:
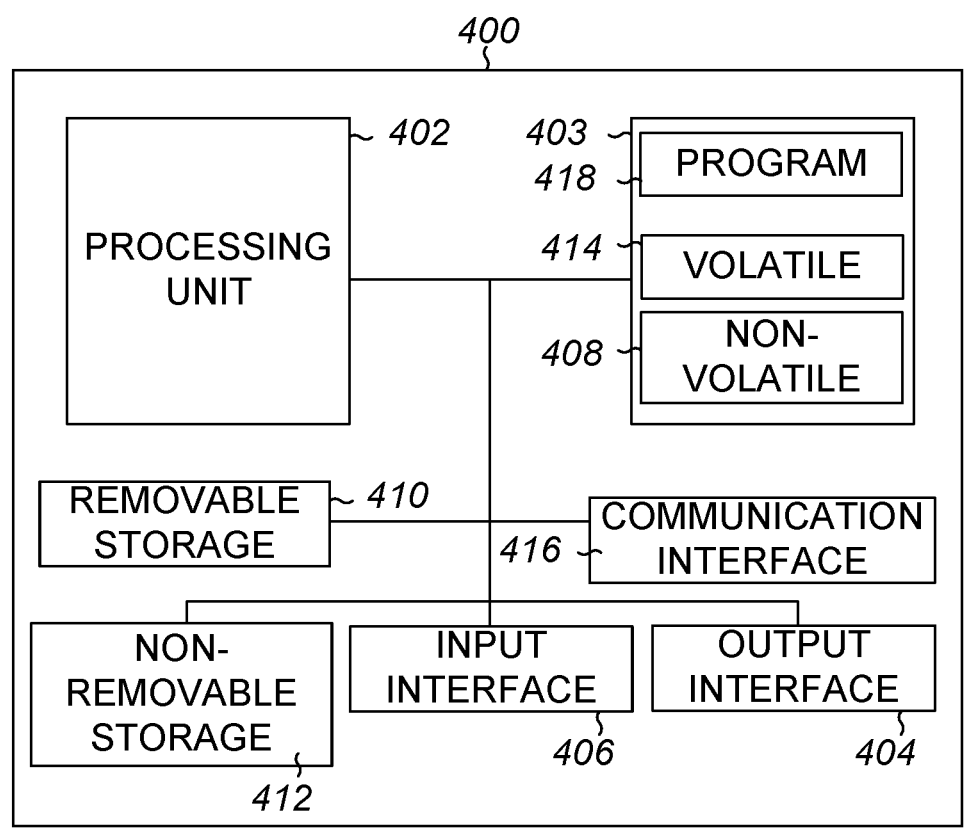
FIG. 4 illustrates, by way of example, a block diagram of an embodiment of a machine (e.g., a computer system) to implement one or more embodiments.

FIG. 4 illustrates, by way of example, a block diagram of an embodiment of a machine 400 (e.g., a computer system) to implement one or more embodiments. The system 100, evidence checker 104, sensitive information scanner 110, sensitive information mitigator 116, data structure 200, method 300 or a component or operations thereof can include or be implemented, at least in part, using a component of the machine 400. One example machine 400 (in the form of a computer), may include a processing unit 402, memory 403, removable storage 410, and non-removable storage 412. Although the example computing device is illustrated and described as machine 400, the computing device may be in different forms in different embodiments. For example, the computing device may instead be a smartphone, a tablet, smartwatch, or other computing device including the same or similar elements as illustrated and described regarding FIG. 4. Devices such as smartphones, tablets, and smartwatches are generally collectively referred to as mobile devices. Further, although the various data storage elements are illustrated as part of the machine 400, the storage may also or alternatively include cloud-based storage accessible via a network, such as the Internet.

Memory 403 may include volatile memory 414 and non-volatile memory 408. The machine 400 may include— or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 400 may include or have access to a computing environment that includes input 406, output 404, and a communication connection 416. Output 404 may include a display device, such as a touchscreen, that also may serve as an input component. The input 406 may include one or more of a touchscreen, touchpad, mouse, keyboard, camera, one or more device-specific buttons, one or more sensors integrated within or coupled via wired or wireless data connections to the machine 400, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 402 (sometimes called processing circuitry) of the machine 400. A hard drive, CD-ROM, and RAM are some examples of articles including a non-transitory computer-readable medium such as a storage device. For example, a computer program 418 may be used to cause processing unit 402 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples.

The evidence checker 104, sensitive information scanner 110, sensitive information mitigator 116, or a combination thereof can be implemented by hardware, software, firmware, or a combination thereof. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

Additional Notes and Examples

Example 1 includes a method comprising receiving a document, determining, by an evidence checker, a keyword that indicates sensitive information of a sensitive information type, is present in the document, responsive to determining the keyword is present, determining, by a sensitive information scanner and based on a regular expression associated with the sensitive information type, that sensitive information is present in the document, and performing a sensitive information mitigation operation to mitigate the sensitive information.

In Example 2, Example 1 further includes, wherein the evidence is a text string that indicates a shape of the sensitive information type.

In Example 3, at least one of Examples 1-2 further includes, wherein the sensitive information type includes one of credit card information, social security number information, or user credentials.

In Example 4, at least one of Examples 1-3 further includes, wherein the keyword is one of a plurality of keywords, the sensitive information type is one of a plurality of sensitive information types, each of the keywords associated with a sensitive information type of the sensitive information types, at least two of the keywords associated with different sensitive information types of the sensitive information types, the regular expression is one of a plurality of regular expressions, each regular expression associated with a sensitive information type of the sensitive information types and a keyword of the keywords, determining the keyword is present in the document includes determining which of the keywords are present in the document, detecting, for each keyword of the keywords present in the document and based on a regular expression associated with the sensitive information type associated with the keyword, whether sensitive information of the sensitive information type is present in the document, and performing one or more sensitive information mitigation actions to mitigate detected sensitive information.

In Example 5, Example 4 further includes, wherein only a regular expression of the regular expressions associated with a keyword of the keywords determined to be present in the document is applied to the document.

In Example 6, at least one of Examples 4-5 further includes, wherein the sensitive information scanner is one of a plurality of sensitive information scanners operating in parallel.

In Example 7, Example 6 further includes, wherein each of the plurality of sensitive information scanners are configured to apply a different regular expression.

In Example 8, at least one of Examples 1-7 further includes, extracting a portion of the document including the keyword, and limiting the sensitive information scanner to operate on the portion of the document.

Example 9 includes a system comprising processing circuitry and a memory coupled to the processing circuitry, the memory including instructions that, when executed by the processing circuitry, cause the processing circuitry to perform the method of at least one of Examples 1-8.

Example 12 includes a machine-readable medium including instructions that, when executed by a machine, cause the machine to perform the method of at least one of Examples 1-8.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
processing circuitry;
a memory including instructions that, when executed by the processing circuitry, cause the processing circuitry to perform operations for scan surface reduction for sensitive information scanning, the operations comprising:
receiving a document;
determining, by an evidence checker and using a simplified regular expression, keywords that indicate sensitive information of a sensitive information type are present in the document, the simplified regular expression including, for each individual character of a number of characters, a type of each character, and an order of each type of character, the type of each character indicating whether the character is a letter, number, or symbol, wherein the simplified regular expression excludes quantification syntax and excludes the use of grouping syntax;
responsive to determining one or more of the keywords is present, determining, by a sensitive information scanner and based on a regular expression associated with the sensitive information type, that sensitive information is present in the document; and
performing a sensitive information mitigation operation to mitigate the sensitive information.

2. The system of claim 1, wherein the keyword is a text string that indicates a shape of the sensitive information type.

3. The system of claim 1, wherein the sensitive information type includes one of credit card information, social security number information, or user credentials.

4. The system of claim 1, wherein:
the keyword is one of a plurality of keywords;
the sensitive information type is one of a plurality of sensitive information types, each of the keywords associated with a sensitive information type of the sensitive information types, at least two of the keywords associated with different sensitive information types of the sensitive information types;
the regular expression is one of a plurality of regular expressions, each regular expression associated with a sensitive information type of the sensitive information types and a keyword of the keywords, each of the regular expressions applied by respective sensitive information scanners operating in parallel;
determining the keyword is present in the document includes determining which of the keywords are present in the document;
detecting, for each keyword of the keywords present in the document and based on a regular expression associated with the sensitive information type associated with the keyword, whether sensitive information of the sensitive information type is present in the document; and
performing one or more sensitive information mitigation actions to mitigate detected sensitive information.

5. The system of claim 4, wherein only a regular expression of the regular expressions associated with a keyword of the keywords determined to be present in the document is applied to the document.

6. The system of claim 4, wherein the sensitive information scanner is one of a plurality of sensitive information scanners operating in parallel.

7. The system of claim 6, wherein each of the plurality of sensitive information scanners are configured to apply a different regular expression.

8. The system of claim 1, wherein:
the sensitive information type is one of a plurality of sensitive information types; and
the operations further comprise:
  extracting a different amount of the document for different sensitive information types, each different amount of the document including the keyword and including different amounts of the document before and after the keyword; and
  limiting the sensitive information scanner to operate on the extracted amount of the document.

9. A computer-implemented method for scan surface reduction for sensitive information scanning, the method comprising
receiving a document;
determining, by an evidence checker and using a simplified regular expression, keywords that indicate sensitive information of a sensitive information type are present in the document, the simplified regular expression including, for each individual character of a number of characters, a type of each character, and an order of each type of character, the type of each character indicating whether the character is a letter, number, or symbol, wherein the simplified regular expression excludes quantification syntax and excludes the use of grouping syntax;
responsive to determining one or more of the keywords is present, determining, by a sensitive information scanner and based on a regular expression associated with the sensitive information type, that sensitive information is present in the document; and
performing a sensitive information mitigation operation to mitigate the sensitive information.

10. The method of claim 9, wherein the keyword is a text string that indicates a shape of the sensitive information type.

11. The method of claim 9, wherein the sensitive information type includes one of credit card information, social security number information, or user credentials.

12. The method of claim 9, wherein:
the keyword is one of a plurality of keywords;
the sensitive information type is one of a plurality of sensitive information types, each of the keywords associated with a sensitive information type of the sensitive information types, at least two of the keywords associated with different sensitive information types of the sensitive information types;
the regular expression is one of a plurality of regular expressions, each regular expression associated with a sensitive information type of the sensitive information types and a keyword of the keywords, each of the regular expressions applied by respective sensitive information scanners operating in parallel;
determining the keyword is present in the document includes determining which of the keywords are present in the document;
detecting, for each keyword of the keywords present in the document and based on a regular expression associated with the sensitive information type associated with the keyword, whether sensitive information of the sensitive information type is present in the document; and
performing one or more sensitive information mitigation actions to mitigate detected sensitive information.

13. The method of claim 12, wherein only a regular expression of the regular expressions associated with a keyword of the keywords determined to be present in the document is applied to the document.

14. The method of claim 12, wherein the sensitive information scanner is one of a plurality of sensitive information scanners operating in parallel.

15. The method of claim 14, wherein each of the plurality of sensitive information scanners are configured to apply a different regular expression.

16. The method of claim 9, wherein the sensitive information type is one of a plurality of sensitive information types and the method further comprises:
extracting a different amount of the document for different sensitive information types, each different amount of the document including the keyword and including different amounts of the document before and after the keyword; and
limiting the sensitive information scanner to operate on the extracted amount of the document.

17. A machine-readable medium including instructions that, when executed by a machine, cause the machine to perform operations for scan surface reduction for sensitive information scanning, the operations comprising:
receiving a document;
determining, by an evidence checker and using a simplified regular expression, keywords that indicate sensitive information of a sensitive information type are present in the document, the simplified regular expression including, for each individual character of a number of characters, a type of each character, and an order of each type of character, the type of each character indicating whether the character is a letter, number, or symbol, wherein the simplified regular expression excludes quantification syntax and excludes the use of grouping syntax;
responsive to determining one or more of the keywords is present, determining, by a sensitive information scanner and based on a regular expression associated with the sensitive information type, that sensitive information is present in the document; and performing a sensitive information mitigation operation to mitigate the sensitive information.

18. The machine-readable medium of claim 17, wherein the keyword is a text string that indicates a shape of the sensitive information type.

19. The machine-readable medium of claim 17, wherein the sensitive information type includes one of credit card information, social security number information, or user credentials.

20. The machine-readable medium of claim 18, wherein:
the keyword is one of a plurality of keywords;
the sensitive information type is one of a plurality of sensitive information types, each of the keywords associated with a sensitive information type of the sensitive information types, at least two of the keywords associated with different sensitive information types of the sensitive information types;
the regular expression is one of a plurality of regular expressions, each regular expression associated with a sensitive information type of the sensitive information types and a keyword of the keywords, each of the regular expressions applied by respective sensitive information scanners operating in parallel;
determining the keyword is present in the document includes determining which of the keywords are present in the document;
detecting, for each keyword of the keywords present in the document and based on a regular expression associated with the sensitive information type associated with the keyword, whether sensitive information of the sensitive information type is present in the document; and
performing one or more sensitive information mitigation actions to mitigate detected sensitive information.

* * * * *